US010015795B1

(12) United States Patent
Wolf et al.

(10) Patent No.: US 10,015,795 B1
(45) Date of Patent: Jul. 3, 2018

(54) MOBILE CELLULAR DEVICE TRANSLATION INTO A SECURE CHANNEL IDENTIFIER FOR RESOURCE MANAGEMENT

(71) Applicant: BANK OF AMERICA CORPORATION, Charlotte, NC (US)

(72) Inventors: Jon Robert Wolf, Charlotte, NC (US); Charles R. Liu, San Francisco, CA (US); Matthew Edward Williams, Frisco, TX (US); Jill A. Hatfield, North Easton, MA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/633,308

(22) Filed: Jun. 26, 2017

Related U.S. Application Data

(60) Provisional application No. 62/466,914, filed on Mar. 3, 2017.

(51) Int. Cl.
*H04W 12/06* (2009.01)
*H04W 72/04* (2009.01)
(Continued)

(52) U.S. Cl.
CPC .......... *H04W 72/048* (2013.01); *H04L 67/36* (2013.01); *H04M 1/7253* (2013.01);
(Continued)

(58) Field of Classification Search
CPC ....... G06F 21/316; G06F 21/45; H04L 63/08; H04L 63/102; G06Q 40/00; G07D 11/00; G07F 19/00; G06K 5/00
(Continued)

(56) References Cited

U.S. PATENT DOCUMENTS 6,145,738 A 11/2000 Stinson et al.
6,328,207 B1 12/2001 Gregoire et al.
(Continued)

OTHER PUBLICATIONS https://www.regions.com/personal_banking/depositsmart_atms.rf.
http://www.bankrate.com/financing/banking/check-cashing-comes-to-atms/.
https://www.americanbanker.com/news/getting-cash-phone-it-in-wintrust-embraces-the-cardless-atm.

*Primary Examiner* — Phuoc H Doan
(74) *Attorney, Agent, or Firm* — Michael A. Springs; Moore & Van Allen PLLC; Nicholas C. Russell

(57) ABSTRACT

Embodiments of the present invention relate to, in general, mobile device translation into a secure channel identifier for resource management. Typically, a system configured to establish a network activity channel with a networked device is provided. In some embodiments, based on analyzing a trigger signal, the system is configured to identify a network activity initiated by the user. In some embodiments, the system identifies a network activity channel configured for performing the network activity initiated by the user, based on at least determining a channel latency of the network activity channel. The system may then present the network activity channel to the user, configure the network activity channel such that the mobile device associated with the user is a secure channel identifier for performing the network activity; and modify, dynamically, a channel interface associated with the network activity channel based on the identified network activity and the trigger signal.

20 Claims, 5 Drawing Sheets

(51) Int. Cl.
  *H04L 29/08* (2006.01)
  *H04W 76/04* (2009.01)
  *H04M 1/725* (2006.01)
  *H04W 76/02* (2009.01)
  *H04W 4/02* (2018.01)

(52) U.S. Cl.
  CPC ....... *H04M 1/72577* (2013.01); *H04W 4/023* (2013.01); *H04W 76/021* (2013.01); *H04W 76/04* (2013.01)

(58) Field of Classification Search
  USPC ........ 705/41, 44, 36, 35, 67; 455/452.1, 411
  See application file for complete search history.

(56) References Cited

U.S. PATENT DOCUMENTS

| | | | |
|---|---|---|---|
| 6,536,663 B1 | 3/2003 | Lozier et al. | |
| 6,578,760 B1 | 6/2003 | Otto | |
| 6,669,086 B2 | 12/2003 | Abdi et al. | |
| 6,856,965 B1 | 2/2005 | Stinson et al. | |
| 7,090,122 B1 | 8/2006 | Warren et al. | |
| 7,257,246 B1 | 8/2007 | Brodie et al. | |
| 7,559,461 B2 | 7/2009 | Crowell et al. | |
| 7,611,048 B1 | 11/2009 | Warren et al. | |
| 8,096,398 B2 | 1/2012 | Folk et al. | |
| 8,172,067 B1 | 5/2012 | Folk et al. | |
| 8,225,988 B1 | 7/2012 | Bohen et al. | |
| 8,249,989 B2 | 8/2012 | Allen | |
| 8,332,321 B2 | 12/2012 | Bosch et al. | |
| 8,424,755 B1 | 4/2013 | Irudayam et al. | |
| 8,548,912 B2 | 10/2013 | Cincera | |
| 8,573,484 B1 | 11/2013 | Irudayam et al. | |
| 8,972,297 B2 | 3/2015 | Kay et al. | |
| 8,985,298 B2 | 3/2015 | Crist et al. | |
| 9,076,135 B2 | 7/2015 | Dent et al. | |
| 9,163,978 B2 | 10/2015 | Crist et al. | |
| 9,311,632 B1 | 4/2016 | Dent | |
| 9,368,002 B2 | 6/2016 | Crist et al. | |
| 9,380,421 B1 | 6/2016 | Vltaysky | |
| 9,432,804 B2 | 8/2016 | Hanson et al. | |
| 9,525,694 B2 | 12/2016 | Pender | |
| 9,589,256 B1 | 3/2017 | Thomas et al. | |
| 2012/0028609 A1* | 2/2012 | Hruska | G06Q 20/3674 455/411 |
| 2012/0084203 A1* | 4/2012 | Mehew | G06Q 20/105 705/41 |
| 2013/0046687 A1 | 2/2013 | Simpson, Jr. | |
| 2013/0205723 A1 | 8/2013 | Blake et al. | |

\* cited by examiner

MOBILE CELLULAR DEVICE TRANSLATION INTO A SECURE CHANNEL IDENTIFIER FOR RESOURCE MANAGEMENT

CROSS-REFERENCE TO PRIORITY APPLICATION

This application claims the benefit of U.S. Provisional Patent Application Ser. No. 62/466,914 entitled "Interactive User Activity Terminal with enhanced Resource Interchange" (filed Mar. 3, 2017), which is hereby incorporated by reference in its entirety.

BACKGROUND

Computer terminals are commonly used by individuals to perform a variety of activities. However, despite the proliferation of mobile devices, mobile devices operate disparate from computer terminals. Moreover, mobile devices are typically not configured allow a user to perform various network activities, seamlessly and with ease, across various channels. Also, performing network activities via the mobile device typically requires navigation of multiple device interfaces and the mobile device is typically configured to perform a certain requested activity using only a predetermined network channel. A needs exists for systems and methods for improving the functionality and connectivity of mobile devices for performing activities.

The present invention addresses the foregoing needs and also provides improvement to technology by improving the functionality of a mobile device to convert the mobile device into a secure channel identifier for resource management. Moreover, the present invention configures the mobile device a central control for seamless multi-channel operative communication across a plurality of networked devices for performing network activities.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the invention relate to systems, computer-implemented methods, and computer program products (e.g., computer readable program code, and/or non-transitory tangible computer readable media): for mobile device translation into a secure channel identifier for resource management, wherein the system is configured to establish a network activity channel with a networked device based on determining channel latency. Typically, in various embodiments of the invention, the systems, methods, and computer program products are configured to: receive, via a first operative communication channel, a trigger signal from a first networked device of the plurality of networked devices, wherein the trigger signal comprises activity data associated with a user, wherein the user is associated with a mobile device; based on analyzing the trigger signal, identify a network activity initiated by the user, wherein the network activity is associated with a user resource; identify a network activity channel configured for performing the network activity initiated by the user, wherein the network activity channel is identified based on at least determining a channel latency of the network activity channel; present the network activity channel to the user, wherein presenting the network activity channel comprises: configuring the network activity channel such that the mobile device associated with the user is a secure channel identifier for performing the network activity; and modifying, dynamically, a channel interface associated with the network activity channel based on at least the identified network activity and the trigger signal; and transmit, a control signal to the mobile device based on completion of the network activity using the network activity channel.

In some embodiments, or in combination with any of the embodiments herein, configuring the network activity channel such that the mobile device associated with the user is a secure channel identifier for performing the network activity further comprises: transmitting a activation signal to the mobile device, wherein the activation signal is configured to cause an offline mobile device to connect to the communication network; and transmitting an interface control signal to cause the mobile device to overlay the channel interface associated with the network activity channel on an existing display device interface of the mobile device, wherein overlaying the channel interface comprises disabling the existing display device interface such that only the channel interface is active; wherein the channel interface is configured as a remote control for allowing the user to perform the network activity using the mobile device.

In some embodiments, or in combination with any of the embodiments herein, modifying, dynamically, the channel interface associated with the network activity channel further comprises modifying at least one graphical element presented on the channel interface based on the identified network activity and the trigger signal, wherein modifying the at least one graphical element based on the trigger signal comprises altering the at least one graphical element to include at least a portion of a user image retrieved from a storage location of the mobile device.

In some embodiments, or in combination with any of the embodiments herein, configuring the network activity channel such that the mobile device associated with the user is a secure channel identifier for performing the network activity further comprises: accessing a mobile device security identifier stored in the mobile device; validating user authentication credentials received at the mobile device from the user; authenticating, based on (i) successful validation of the user authentication credentials, and (ii) the mobile device security identifier, the mobile device for performing the network activity via the channel; and allowing the user to perform the network activity/user activity, via the network activity channel, using the mobile device.

In some embodiments, or in combination with any of the embodiments herein, the first networked device is a computer terminal, wherein authenticating the mobile device for performing the network activity via the channel further comprises: establishing, via the communication network, a wireless communication channel between the mobile device and the computer terminal; transmitting a control signal to the mobile device, wherein the control signal is configured to cause the mobile device to transmit the mobile device security identifier to the computer terminal via the wireless communication channel; establishing an operative coupling of the mobile device and the computer terminal based on successful validation of the mobile device security identifier; and allowing the user to perform the network activity at the computer terminal based on (i) receiving user input at the computer terminal via the wireless communication channel, wherein the user input is provided by the user at the mobile device and not at the computer terminal, and (ii) presenting the channel interface on the mobile device such that the channel interface comprises at least a portion of an interface presented on the computer terminal.

In some embodiments, or in combination with any of the embodiments herein, allowing the user to perform the network activity at the computer terminal further comprises: transmitting, from the computer terminal, an activity signal to the mobile device, wherein the activity signal is configured to modify the channel interface for performing the network activity.

In some embodiments, or in combination with any of the embodiments herein, the computer terminal is one of an ATM, a transaction terminal, a smart device, and a communication device.

In some embodiments, or in combination with any of the embodiments herein, modifying, dynamically, the channel interface associated with the network activity channel further comprises: modifying at least one first graphical element displayed on a display device interface of the computer terminal in real time, based on identifying that the user is within a predetermined proximity to the computer terminal, wherein modifying the at least one graphical element comprises altering the at least one graphical element to include at least a portion of a user image retrieved from a storage location of the mobile device.

In some embodiments, or in combination with any of the embodiments herein, identifying that the user is within the predetermined proximity to the computer terminal is based on at least one of (i) the established operative coupling of the mobile device and the computer terminal, (ii) determining, via received location signals from a positioning device of the mobile device, that the mobile device is within the predetermined proximity to the computer terminal, and (iii) identifying, via an image capture device, that the user is within the predetermined proximity to the computer terminal.

In some embodiments, or in combination with any of the embodiments herein, identifying the network activity channel configured for performing the network activity initiated by the user further comprises: identifying a plurality of network activity channels configured for performing the network activity initiated by the user; determining, for each network activity channel, a channel latency; selecting the network activity channel of the plurality of network activity channels for performing the network activity based on determining that the network activity channel has a predetermined channel latency.

In some embodiments, or in combination with any of the embodiments herein, the predetermined channel latency comprises at least one of minimum activity time, minimum resource utilization, minimum travel distance, and a activity channel resource utilization offset.

In some embodiments, or in combination with any of the embodiments herein, identifying a network activity initiated by the user further comprises: identifying a primary activity associated with the user resource that the user seeks to perform; based on analyzing the primary activity and the trigger signal, identifying an auxiliary activity associated with performing the primary activity; and identifying the network activity channel configured for performing the auxiliary activity.

In some embodiments, or in combination with any of the embodiments herein, the first networked device is the mobile device, wherein the trigger signal comprises at least one of a user input provided at the mobile device, a user geographic location signal received from a positioning device of the mobile device, and user calendar data from a calendar stored on the mobile device.

In some embodiments, or in combination with any of the embodiments herein, the first networked device is a proximity transmitter device, wherein the trigger signal is transmitted by the proximity transmitter device based on determining that the user is within a predetermined proximity of the proximity transmitter device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
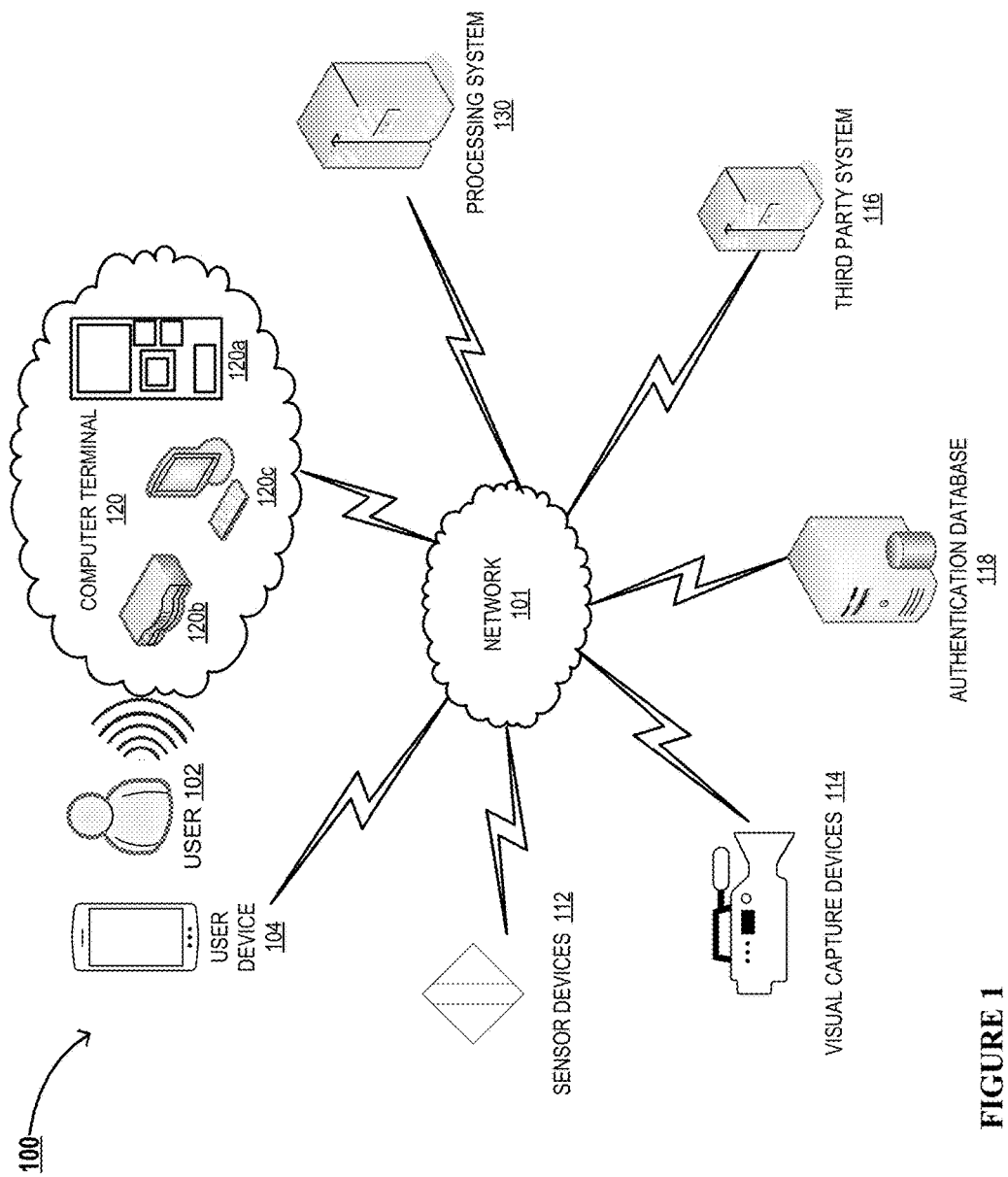
FIG. 1 illustrates a block network architecture diagram illustrating a system environment 100 for mobile cellular device translation into a secure channel identifier for resource management, in accordance with some embodiments of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with a network connected resource transfer platform, and particularly geolocation systems and devices. As such, the entity may be any institution, group, association, financial institution, merchant, establishment, company, union, authority or the like. Typically, the entity is associated with one or more computer terminals. Typically, the entity owns the computer terminals, operates computer terminals, provides the computer terminal devices, facilitates services associated with the computer terminals, and/or is otherwise associated with the computer terminals.

As described herein, a "user" is an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a computer terminal, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and computer terminals described herein. In other embodiments, a user may be a system or an entity performing one or more tasks described herein.

The term "computer terminal" or "user activity terminal" as used herein may refer to one or more electronic devices that facilitate one or more user activities or transactions. In some embodiments, the computer terminal may refer to any device (or networked device) that is configured to operatively communicate with a mobile device via a network. Typically, a computer terminal is configured to facilitate performance of one or more user activities by establishing an "interactive session" between a user and the computer terminal, and more specifically between the user's mobile device and the computer terminal (e.g., via a secure wireless communication channel). As such, the terms "user activity", "network activity" or "user transaction" or simply "activity" may refer to financial or non-financial activities, tasks, events or actions. In some embodiments a computer terminal refers to one or more devices that facilitate execution of financial transactions or activities. In this regard, the computer terminals may be Automated Teller Machines (ATMs), Point of sale (POS) devices, vending machines, checkout registers, ticket vending machines, automated retail transaction devices, banking terminals in a financial institution, financial institution servers, merchant servers, other computing devices that involve financial user activities or transactions in one form or another, or may comprise technology elements and/or functionality of one or more aforementioned devices, or a suitable combination of the aforementioned devices/apparatuses. In some embodiments the computer terminal refers to devices that facilitate execution of non-financial user activities or transactions, for example, smart devices (e.g., secure doors with authentication features, smart learning walls, smart televisions, tablets, smart automobiles, and the like), check-in terminals for various industries, for example: hospitality, travel, healthcare and the like, information kiosks and other computer terminals that do not involve a user performing a financial transaction via the computer terminal. In some embodiments the computer terminals enable execution of both financial and non-financial transactions/activities (e.g., a computer terminal may be a suitable combination of any of the aforementioned terminal devices with respect to their features, design and/or function). That said, computer terminals may also refer to portable devices that facilitate financial and/or non-financial transactions, such as personal computers, laptop computers, tablet computers, smartphones, wearable devices, personal digital assistants (PDAs), and other computing devices. In some embodiments, the computer terminals may be owned, operated and/or otherwise associated entities and are installed at suitable locations, such that the user can travel to the location of the computer terminal to perform user activities or execute transactions. In some embodiments, the computer terminals may be owned, operated and/or otherwise associated with the user. In embodiments described herein, performing a user activity or transaction may refer to the initiation, stages during the processing, or completion of a transaction. The computer terminal of the present invention is interactive and is configured to communicate with a user using visual, audio or other means, either directly (e.g., using display devices of the computer terminal) or via suitable devices (e.g., via a user mobile device).

Typically, the user may provide authentication credentials for conducting user activities or transactions at the computer terminal. In some embodiments, computer terminals require the user to perform one or more authentication steps based on the level of authorization desired for a particular user activity or transaction. In this regard, for example, the user may slide cards with magnetic strips, provide one or more account numbers, user identifiers or userID and the like and further may provide the accompanying personal identification numbers (PIN), passwords, CVV numbers and the like associated with the individual computer terminal and/or the individual card/account provided for authentication.

A "user activity", a "network activity", a "resource transfer" or "resource distribution" or a transaction refers to any communication between a user and the financial institution or other entity monitoring the user's activities to transfer funds for the purchasing or selling of a product, financial activities or non-financial activities of a user. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device (e.g. a mobile cellular device), a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Referring to FIG. 1, a block diagram illustrating a system environment 100 configured for providing an interactive user activity terminal configured for enhanced resource interchange and mobile device translation into a secure channel identifier for resource interchange, is illustrated, in accordance with some embodiments of the invention. As illustrated, the system environment 100 may comprise a computer terminal 120 (also referred to as a user activity terminal 120), in operative communication with one or more user devices 104 associated with a user 102, a processing system 130, one or more sensor devices 112, one or more visual capture devices 114, an authentication database 118, a third party system 116 and/or other systems/devices not illustrated herein, via a network 101. As such, the computer terminal 120 is configured such that the user 102 may perform one or more user activities or transactions by utilizing the computer terminal directly (for example, by physically operating the computer terminal 120 and its interfaces, using input/output devices of the terminal 120, using audio commands, using physical gestures, and the like) and/or via communication between the user device 104 and the terminal 120 (for example, by establishing operative communication channels between the user device 104 and the terminal 120 via a wireless network and interacting with the terminal 120 via the devices and interfaces of the user device 104).

Typically, the processing system 130 and the authentication database 118 are in electronic communication with the computer terminal 120, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the computer terminal 120). In this regard, the wireless communication channel may further comprise near field communication (NFC), communication via radio waves, communication through the internet, communication via electromagnetic waves and the like.

As discussed previously, the computer terminal 120 is configured to facilitate performance of user activities, and is configured to provide real-time interactive sessions for the user 102. In some embodiments, the computer terminal 120 or the user activity terminal 120 is an ATM 120a configured for uniquely facilitating user activities in accordance with some embodiments, while ensuring the security and privacy of the user. In some embodiments, the computer terminal 120 is a point of sale terminal 120b, a computing device 120c, a vending machine, a kiosk, and/or another device, or a suitable combination of the aforementioned devices, that is configured to facilitate the user activity. The components of the computer terminal 120, its features and functions will be described in detail through this disclosure and with respect to FIG. 2, in particular.

In some embodiments, the computer terminal 120 receives signals, images and other data captured by the sensor devices 112 and/or the visual capture devices 114, during its execution of user activities. In this regard, in some embodiments, the computer terminal 120 communicates with, transmits instructions, and/or receives signals from the sensor devices 112 and the visual capture devices 114 directly, via the network 101, typically, in real-time. In some embodiments, the computer terminal 120 communicates with the sensor devices 112 and the visual capture devices 114 through the processing system 130, typically, in real-time. Analyzing the signals received from the sensor devices 112 and the visual capture devices 114 typically enables the computer terminal 120, the processing system 130, or the devices 112 and 114 themselves, to determine user location, determine trigger events (e.g., user approach to the terminal 120, retrieve/identify user authentication credentials from the user and/or the user device, establishing communication with the user device in the vicinity of the terminal, determination of whether the user device comprises an integrated resource transfer application, and the like), capture one or more parameters associated with the environment or physical location of the computer terminal 120, and the like.

In some embodiments, the sensor devices 112 are position sensors configured to sense or determine the position and/or location of the user 102, other individuals, objects/devices, or entities. As such, the sensor devices 112 may determine an absolute position (for example, location/positioning coordinates) or a relative position (for example, with respect to the position of the terminal 120, with respect to position of the user or another individual, with respect to the sensor 112 itself or a predetermined object and the like) of the user, individual or object. Here, in some embodiments, the sensor devices 112 are proximity sensors that are configured to determine the presence of the user or object within a predetermined proximity area. These sensor devices 112 may be contact type sensors that determine the presence of the user or object based on contact, or non-contact type sensors that detect distant users or objects. Typically, the sensor devices 112 comprise a first transducer that is configured to convert electrical energy into a proximity signal (for example, an electromagnetic wave, a sound wave, and the like) that is broadcast in a predetermined proximity area. The incidence of the proximity signal on physical users or objects within the proximity area results in a return signal/wave that is captured by the sensor 112. The return signal/wave is then converted to an electric signal by a second transducer of the sensor. This electric signal may be analyzed, in real-time, by the sensor 112, the terminal 120, and/or the processing system 130, to determine the location of the user/object and/or track movement of the user/object. Here, the sensor 112 may be configured to perform modulation, demodulation, amplification and output switching of the proximity and return signals.

For example, in some embodiments, the sensor devices 112 comprise ultrasonic sensors that are configured to transmit a proximity signal comprising sound waves (typically with frequencies above 18 kHz) and are further configured to receive a return signal in the form or an echo, which is then converted to an electric signal for analysis. As another example, in some embodiments, the sensor devices 112 comprise optical sensors or photoelectric sensors that are configured to transmit a proximity signal comprising electromagnetic waves, and specifically light waves (for example, infrared waves with frequencies in the range of about 600 GHz to 430 THz, such as pulsed infrared or visible red waves, laser waves in the visible or infrared frequency range, and the like) and are further configured to receive a return signal, either in the form of a reflection signal or interruption of the light proximity signal at receiver associated with the sensor 112, which is then converted to an electric signal for analysis. As yet another example, the sensor devices 112 comprise inductive proximity sensors and inductive position sensors for determining the presence and position, respectively, of users and objects, which generate an induction loop to thereby produce a proximity signal in the form or a magnetic field. The presence of users or objects varies the current flowing through the loop which facilitates determination of presence of users or objects. In some embodiments, the sensor devices 112 comprise sensor devices provided in the user device 104, such as, biometric sensors (for example, fingerprint scanner of a mobile phone, heart rate or temperature monitor of a wearable user device, and the like), location sensors (for example, GPS devices, accelerometers, and the like), visual capture devices/cameras, facial recognition devices, devices for capturing user gestures (for example, a touch screen) and other sensing devices of the user device 104. Here, the terminal 120 and/or the processing system 130 may transmit control signals to the user device to cause the sensing devices of the user device 104 to capture one or more parameters and/or to transmit one or more captured parameters.

The visual capture devices 114 typically comprise cameras and other audio, video and image capture devices. These visual capture devices 114 are configured to capture images and/or video streams, typically in real-time, of a predetermined proximity area. The images and/or video streams may be analyzed by the computer terminal 120, the processing system 130 and/or the capture devices 114, to determine the presence and position of the user, other individuals or objects and their movement in the proximity area. Although described separately, it is understood that the visual capture devices 114 may be associated with the sensor devices 112. As such, sensors or sensor devices, as alluded to herein, may refer to the various sensor devices described herein and the visual/image capture devices described herein.

As alluded to previously, the processing system 130 is in operative communication with the computer terminal 120. In some embodiments, processing system 130 is configured to transmit control instructions that are configured to cause the computer terminal 120, the user device 104, the sensor device 112 and/or the visual capture devices 114 to perform at least a portion of the steps associated with one or more activities. The processing system 130 may be associated with the same entity as the computer terminal 120 or may be associated with another entity. The structure and components of the processing system 130 is described in detail with respect to FIG. 3. The computer terminal 120 may further communicate with the third party system 116 and/or the authentication database 118, either directly or via the processing system 130. The authentication database 118 may comprise authentication credentials associated with the user. The processing system 130 and/or the computer terminal 120 may retrieve the authentication credentials from the authentication database to authenticate the user prior to executing one or more user activities or transactions.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. As discussed previously, in some embodiments, the computer terminals 120 of the present invention are configured to establish operative communication channels with the user device 104 such that, the user 102 may perform one or more user activities, either entirely or in part, at the terminal 120 by interacting with the user device 104. The user device 104 is described in detail with respect to FIG. 4.

Figure 2:
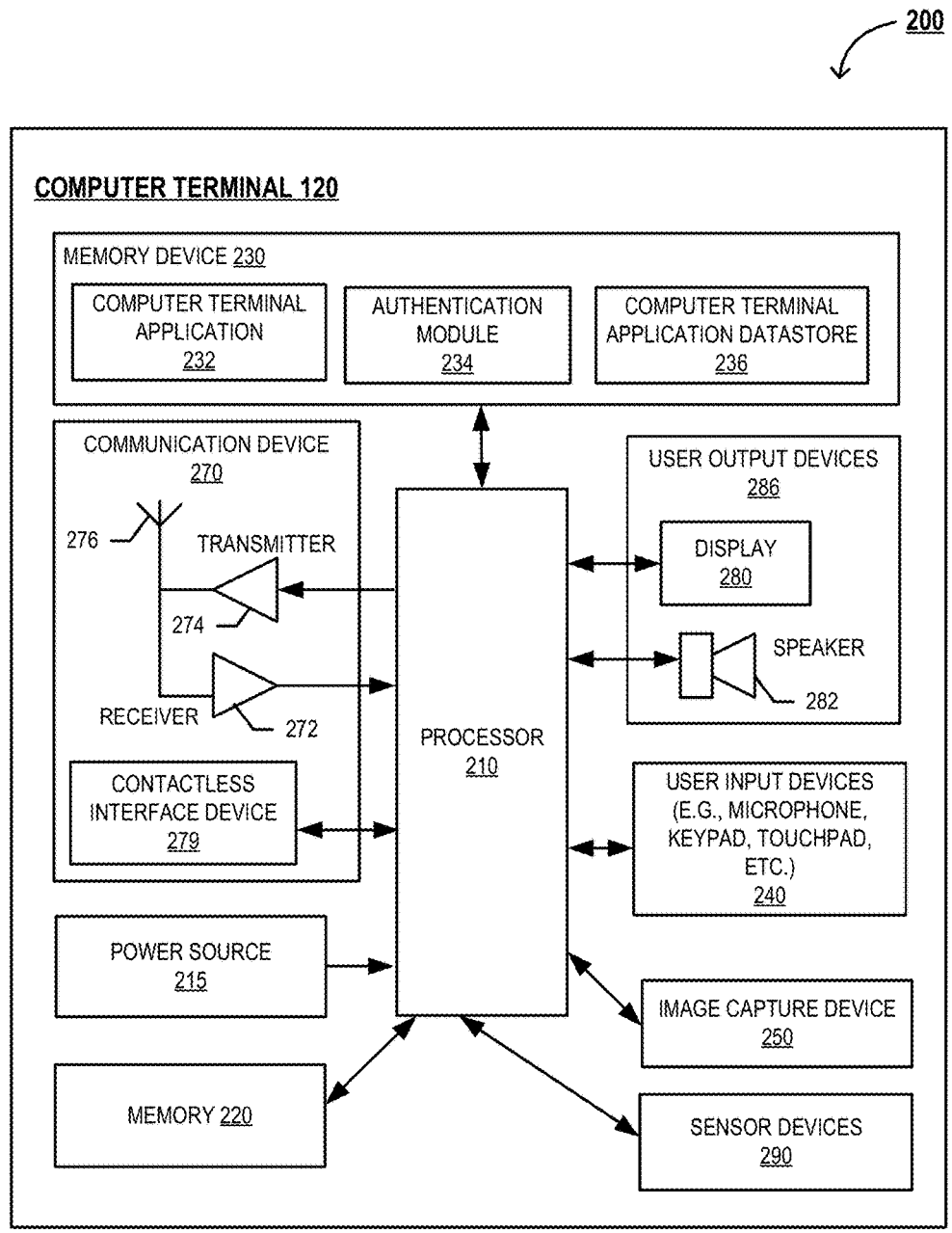
FIG. 2 illustrates a block diagram 200 of a computer terminal system, in accordance with some embodiments of the invention.

FIG. 2, illustrates a block diagram 200 of the computer terminal 120 system, in accordance with some embodiments of the invention. As discussed previously, the computer terminal 120 is configured to facilitate performance of user activities, and is configured to provide or facilitate real-time interactive sessions for the user 102, either on the mobile device of the user or on the terminal itself, using one or more communication channels established via the network 101. The computer terminal 120 typically includes a processing device or a processor 210, memory device 230, storage memory 220 or datastore 220, and a communication device 270. As such, the computer terminal 120, and the processor 210 is particular, is configured to perform at least a portion of the steps of the embodiments described herein, either based on executing computer readable instructions stored in the memory device 230, and/or based on receiving instructions, indications, or signals from other systems and devices such as the processing system 130, the user device 104, sensor devices 112, visual capture devices 114, the user 102, and/or other systems. In some embodiments, the processing system 130 is configured to transmit control instructions to, and cause the processing device 210 to perform one or more steps of the embodiments presented herein. For example, the processing system 130 may detect a trigger event and transmit an indication to the processing device 210. In response to receiving the control signal from the system 130, the processing device 210 may initiate a presentation of environment parameters.

As discussed previously, "computer terminal" or "user activity terminal" as used herein may refer to one or more electronic devices that facilitate one or more user activities or transactions. In some embodiments, the computer terminal may refer to any device (or networked device) that is configured to operatively communicate with a mobile device via a network. Typically, a computer terminal is configured to facilitate performance of one or more user activities by establishing an "interactive session" between a user and the computer terminal, and more specifically between the user's mobile device and the computer terminal (e.g., via a secure wireless communication channel). In some embodiments the computer terminal refers to devices that facilitate execution of non-financial user activities or transactions, for example, smart devices such as, secure doors with authentication features, smart learning walls, smart televisions, tablets, smart automobiles, and the like, mobile devices, check-in terminals for various industries, Automated Teller Machines (ATMs), Point of sale (POS) devices, vending machines, checkout registers, ticket vending machines, automated retail transaction devices, banking terminals in a financial institution, financial institution servers, merchant servers, sensors, transmitter devices, and other devices that involve user activities or transactions in one form or another, or may comprise technology elements and/or functionality of one or more aforementioned devices, or a suitable combination of the aforementioned devices/apparatuses. In some embodiments the computer terminals enable execution of both financial and non-financial transactions/activities (e.g., a computer terminal may be a suitable combination of any of the aforementioned terminal devices with respect to their features, design and/or function).

The processing device 210 may generally refer to a device or combination of devices having circuitry used for implementing the communication and/or logic functions of the computer terminal 120. For example, the processing device 210 may include a control unit, a digital signal processor device, a microprocessor device, and various analog-to-digital converters, digital-to-analog converters, and other support circuits and/or combinations of the foregoing. Control and signal processing functions of the computer terminal 120 may be allocated between these processing devices according to their respective capabilities.

The computer terminal 120 may further include various components/devices in operative communication with and/or controlled by the processor 210, such as user output devices 286, user input devices 240, a network communication interface 279 (such as a contactless interface 279), a power source 215, and the like. Furthermore, in some embodiments, the processor 210 is operatively coupled to and is configured to control other components/devices of the computer terminal 120, such as an image capture device 250, sensor devices 290, and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium. For example, the memory device 230 and/or the storage memory 220 may include any computer memory that provides an actual or virtual space to temporarily or permanently store data and/or commands provided to the processing device 210 when it carries out its functions described herein.

As illustrated by FIG. 2, the memory device 230 typically comprises a computer terminal application 232 (also referred to as a terminal application), an authentication module 234, a computer terminal application datastore 236 stored therein. In some embodiments, the authentication module 234 is integral with the computer terminal application 232. In some embodiments, the computer terminal applications 232 and/or the authentication module 234 may be executable to initiate, perform, complete, and/or facilitate one or more portions of any embodiment described and/or contemplated herein, either independently or in response to receiving control instructions from the processing system 130. In some embodiments, the computer terminal application/module 232 comprises computer readable instructions stored in the memory device 230, which when executed by the processing device 210, are configured to cause the processing device 210 to perform one or more steps of the embodiments presented herein, and/or cause the processing device to transmit control instructions to other components of the terminal 120 and other devices/systems in the network 101 to cause them to perform the steps. Generally, the computer terminal application 232 is executable to receive activity instructions from the user and perform user activities and the various steps described herein. In some embodiments, the computer terminal application 232 comprises a personal digital assistant for interfacing with the user at the terminal. The computer terminal application 232 may be coupled to a computer terminal application datastore 236 for storing application data as the user activity is being performed. The computer terminal application datastore 236 may store the application data temporarily for the predetermined duration of the execution of the activity (such as a memory buffer, or cache memory), or permanently.

The computer terminal 120 may require users to identify and/or authenticate themselves before the computer terminal 120 may initiate, perform, complete, and/or facilitate a user activity. For example, in some embodiments, the computer terminal 120 is configured (and/or the computer terminal application 232 is executable) to authenticate a computer terminal user based at least partially on a computer terminal debit card, smart card, token (e.g., USB token, etc.), username, password, PIN, biometric information, and/or one or more other credentials that the user presents to the computer terminal 120. Additionally or alternatively, in some embodiments, the computer terminal 120 is configured to authenticate a user by using one-, two-, or multi-factor authentication. For example, in some embodiments, the computer terminal 120 requires two-factor authentication, such that the user must provide a valid debit card and enter the correct PIN associated with the debit card in order to authenticate the user to the computer terminal 120. However, either alternatively or in addition to the aforementioned authentication features, the computer terminal 120 may require biometric authentication of the user 102 before initiating, performing, completing, and/or facilitating a user activity.

In some embodiments, the authentication module 234 comprises computer readable instructions that when executed by the processing device 210 cause the processing device to perform one or more functions and/or transmit control instructions to other components or devices to perform one or more authentication steps described herein. These authentication steps typically include requesting authentication credentials from the user via the user output devices 286 (for example, based on determining the desired authorization level for the user activity), activating pertinent sensors and devices for receipt of the credentials (sensor devices 290/image capture devices 250 for biometric credentials, card reader devices 240 for reading magnetic strips of the user's card(s), contact less interface device 279 for receiving authentication tokens from a user device via NFC channels, and the like), receiving authentication credentials, validating the credentials (for example based on retrieving user credentials from the datastore 236, memory 220, processing system 130 and/or database 118), and the like. That said, as shown, the processing device 210, in turn, is operatively connected to and is also configured to control and cause the communication device 270, the memory device 230, and other components described herein to perform one or more functions, at least in part.

The communication device 270 may comprise a modem 271 (not illustrated), a receiver 272, a server 273 (not illustrated), a transmitter 274, transceiver, and/or another device for communicating with other devices and systems on the network 101. The communication device 270 may further comprise a contact, contactless, wireless and/or wired interface that is configured to establish communication between components of the computer terminal 120, between the computer terminal 120, particularly the processing device 210, and other devices or systems, such as the processing system 130, the user device 104, the authentication database 118, the third party system 116, and the like. In this regard, the communication interface 270 comprises a transmitter 274, a receiver 272, a broadcasting device 276 to transmit and receive signals from corresponding devices via a suitable transmission medium or a communication channel. In some embodiments, the computer terminal 120 is configured to be coupled/connected to other devices and systems via wired communication channels. In other embodiments, the computer terminal 120 is configured to be coupled/connected to other devices via a wireless channel. In this regard, the wireless communication channel may comprise near field communication (NFC), communication via radio waves, communication through the internet, communication via electromagnetic waves and the like. The communication device 270 may further comprise a contactless interface device 279 for establishing contactless communication with other devices, such as the user device 104. Here, the computer terminal 120 may include a transceiver, i.e., one or more antennas and and/or other electronic circuitry, devices, and software, for receiving data when a device is held close to or tapped at a suitable location of the computer terminal 120. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 may transmit and receive radio frequency signals, respectively, from the computer terminal 120 within a distance of up to approximately 25 cm, and from 0-20 cm, such as from 0-15 cm, and 0-10 cm, and the like.

Establishing the communication channels may also include signaling information in accordance with the air interface standard of the applicable cellular system of the wireless telephone network that may be part of the network 101. In this regard, the computer terminal 120 may be configured to operate with one or more air interface standards, communication protocols, modulation types, and access types. By way of illustration, the computer terminal 120 may be configured to operate in accordance with any of a number of first, second, third, and/or fourth-generation communication protocols and/or the like. For example, the computer terminal 120 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The computer terminal 120 may also be configured to operate in accordance with non-cellular communication mechanisms, such as via a wireless local area network (WLAN) or other communication/data networks The user interface of the computer terminal 120 may include user input devices 240 and user output devices 286, as illustrated by FIG. 2. The user interface of the computer terminal 120 is typically configured to facilitate the interactive sessions with the user. The user output devices 286 typically include a display 280 (e.g., a liquid crystal display, a touchscreen display, and/or the like) which is operatively coupled to the processing device 210. In some embodiments, where the computer terminal 120 requests the user's signature (if needed), the display may also serve as a touchpad input device to input the user's signature via a stylus. Other output devices may include one or more LEDs or an audio speaker 282, both which may indicate to the user various steps of a user activity. The output devices 286 including the display 280 typically provide instructions and information to the user, regarding the user activity and steps associated with the user activity. The user interface 126 may include any number of user input devices 240 allowing the computer terminal 120 to transmit/receive data to/from the user 102, such as a keypad, keyboard, touch-screen, touchpad, microphone, mouse, joystick, other pointer device, button, soft key, and/or other input device(s). A printer that can print paper receipts may also be incorporated into the computer terminal 120.

As illustrated by FIG. 2, the computer terminal may further comprise an image capture device 250. The image capture device 250 typically comprises cameras and other audio, video and image capture devices. The image capture device 250 is configured to capture images and/or video streams, typically in real-time, of a predetermined proximity area in the vicinity of the computer terminal 120 location. The images and/or video streams may be analyzed by the computer terminal 120 to determine the presence and position of the user, other individuals or objects and their movement in the proximity area, to identify the user for authentication or facial recognition purposes, and the like. In some embodiments, the system is configured to present a customized interface for the user based on identifying the user using facial recognition.

In some embodiments, the computer terminal further comprises sensor devices 290. In some embodiments, the processor 210 communicates with, transmits instructions, and/or receives signals from the sensor devices 290, in real-time for detecting the presence of the users or other individuals, determining user location, capturing authentication credentials for the user, determining parameters associated with the user, determining trigger events, capturing one or more parameters associated with the environment or physical location of the computer terminal 120, and the like. These sensor devices 112 may be contact type sensors that determine the presence of the user or object based on contact, or non-contact type sensors that detect distant users or objects. In some embodiments, the sensor devices 290 of the computer terminal are similar to the sensor devices 112 described previously, for determining the absolute or relative position, location, and proximity of the user, other individuals, or predetermined objects (such as vehicles, and vehicle features like contours of windows), within a predetermined proximity area. For example, the sensor devices 290 may comprise ultrasonic sensors, optical sensors, photoelectric sensors, capacitance sensors, inductive proximity/position sensors, visual capture devices (as described with respect to image/visual capture devices 114 and 250), and the associated transducers, transmitter and modulators, described in detail previously.

In some instances, the sensor devices 290 comprise biometric sensors for capturing parameters associated with the user, such as fingerprint scanners, voice recognition sensors, facial recognition sensors, heart rate sensors, user stress level sensors and the like. These biometric sensors 290 are configured to retrieve, receive, analyze and or validate biometric credentials associated with the user. In this regard, the biometric sensors 290 may comprise optical sensors, ultrasonic sensors, and/or capacitance sensors. The biometric sensors may further comprise radio frequency, thermal, pressure, piezo-resistive/piezoelectric, microelectromechanical sensors, and the like.

Figure 3:
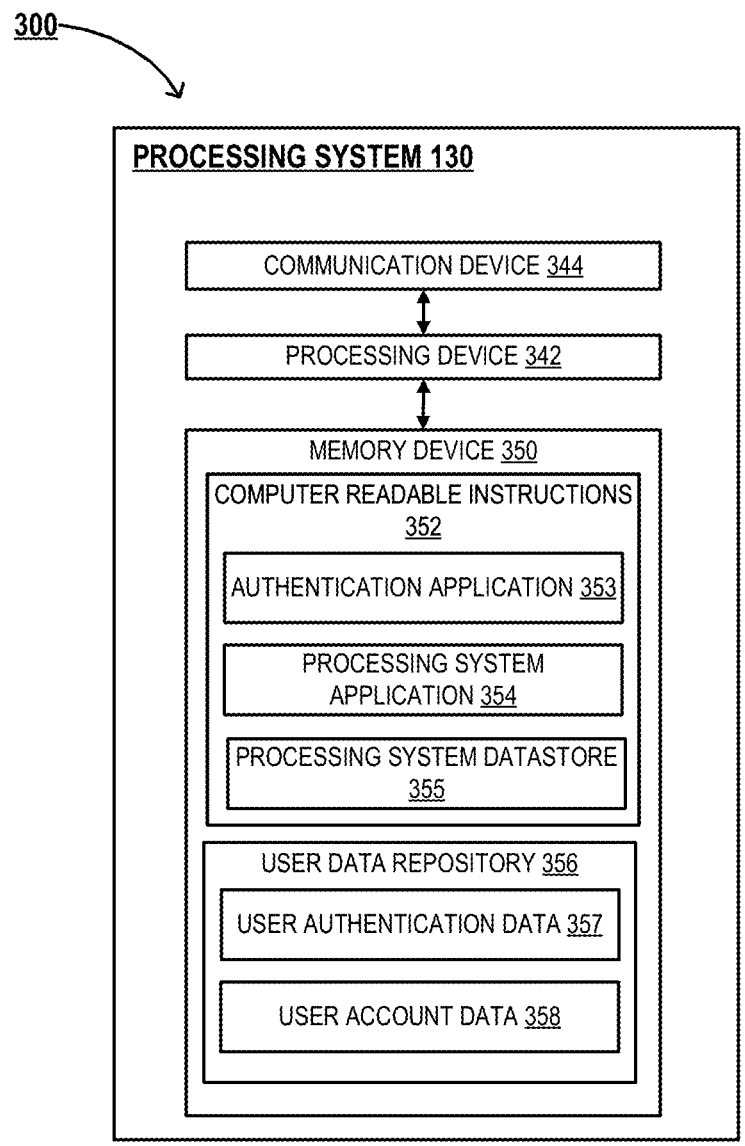
FIG. 3 illustrates a block diagram 300 of a processing system, in accordance with some embodiments of the invention.

FIG. 3 illustrates a block diagram 300 of the processing system 130, in accordance with some embodiments of the invention. As illustrated in FIG. 3, the processing system 130 may include a communication device 344, a processing device 342, and a memory device 350 having an authentication application/module 353, a processing system application 354 and a processing system datastore 355 stored therein. As shown, the processing device 342 is operatively connected to and is configured to control and cause the communication device 344, and the memory device 350 to perform one or more functions. Furthermore, the processing device 342 is typically configured to control and cause the processing device 210 of the computer terminal 120, the sensor devices 112, and visual capture devices 114, to perform one or more functions. In some embodiments, the authentication application 353 and/or the processing system application 354 comprises computer readable instructions that when executed by the processing device 342 cause the processing device 342 to perform one or more functions and/or transmit control instructions to the computer terminal 120, the authentication database 118, the third party system 116, the sensor devices 112, and visual capture devices 114, and/or the communication device 344. It will be understood that the authentication application 353 and/or the processing system application 354 may be executable to initiate, perform, complete, and/or facilitate one or more portions of any embodiments described and/or contemplated herein, and specifically embodiments directed to user activities. The authentication application 353 may comprise executable instructions associated with one or more authentication steps of user activities, and may be embodied within the processing system application 354 in some instances. In some embodiments, the authentication application 353 is similar to the authentication module 234 described previously. The processing system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 344 may generally include a modem, server, transceiver, and/or other devices for communicating with other devices on the network 101. The network communication device 344 may be a communication interface having one or more communication devices configured to communicate with one or more other devices on the network 101, such as the processing system 130, the sensor devices 112, and visual capture devices 114, other processing systems, data systems, etc.

Additionally, referring to processing system 130 illustrated in FIG. 3, the processing device 342 may generally refer to a device or combination of devices having circuitry used for implementing the communication and/or logic functions of the processing system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the processing system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

Furthermore, a "user interface" (not illustrated) may be associated with the processing system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 130, the user device 104 or the display device 280 of the computer terminal 120. As another example, the user interface may be provided on the computer terminal 120 that may be controlled by the processing system 130 either directly or via the processing device 210 of the computer terminal 120.

The memory device 350 within the processing system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The processing system 130 may be used by a third party/entity 116 to interact with the computer terminal 120, based on providing requisite authorization. The processing system 130 may further comprise a user data repository 356 comprising user authentication data 357 and user account data 358. The processing system 130 may utilize the authentication data 357 to validate user authentication credentials. Furthermore, the account data 358 may reflect the current account data of the user.

Figure 4:
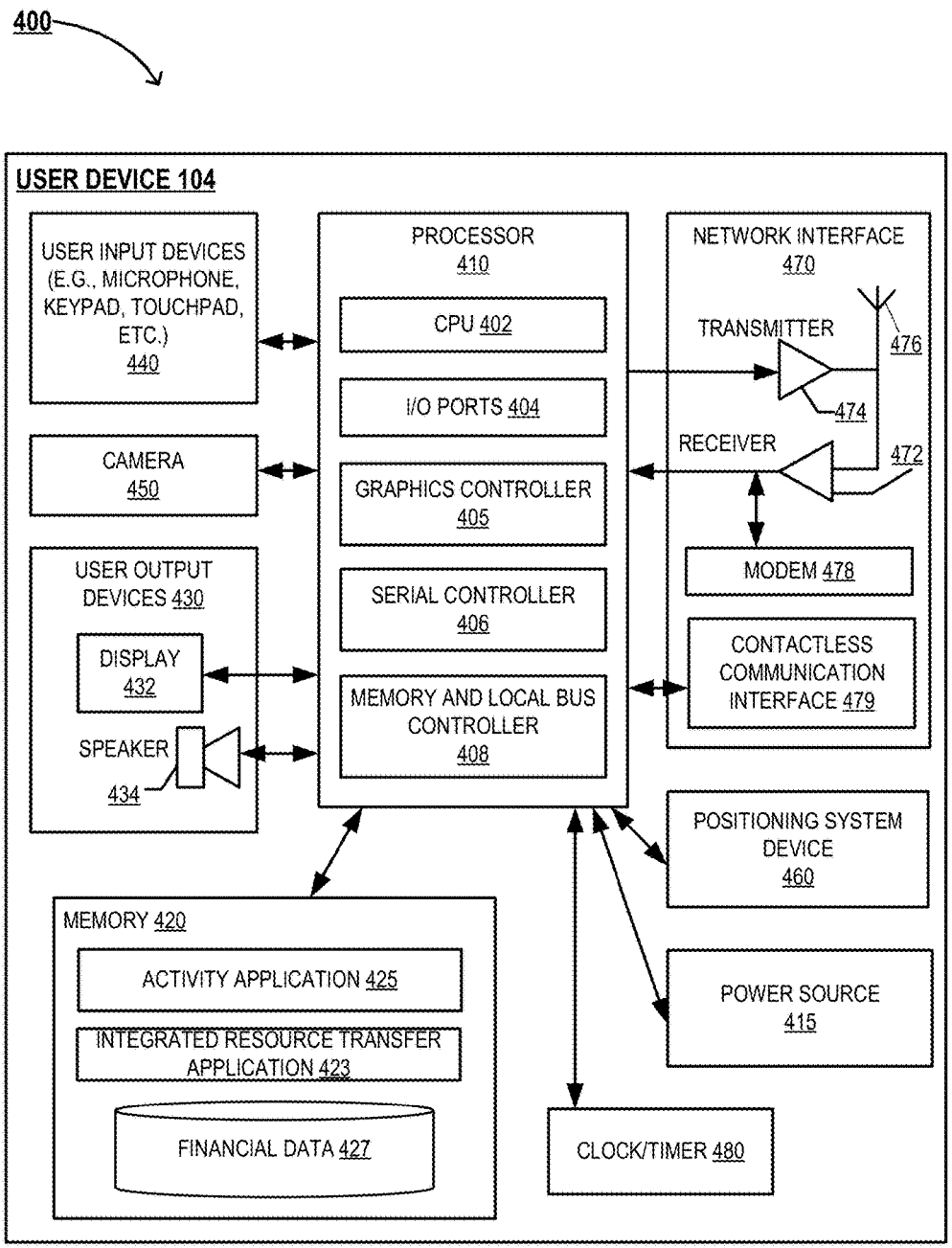
FIG. 4 illustrates a block diagram 400 of a user device, in accordance with some embodiments of the invention.

FIG. 4 illustrates a block diagram 400 of the user device 104, such as a user mobile device, in accordance with some embodiments of the invention. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, gaming devices, laptop computers, cameras, video recorders, audio/video player, radio, GPS devices, any combination of the aforementioned devices.

The mobile device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408.

The processor 410 may include functionality to operate one or more software programs or applications, which may be stored in the memory device 420. For example, the processor 410 may be capable of operating applications such as the activity application 425, a integrated resource transfer application 423, or a web browser application. The activity application 425 may then allow the mobile device 104 to transmit and receive data and instructions from the computer terminal 120 (for example, via wireless communication or NFC channels), data and instructions from the processing system 130, web content, such as, for example, location-based content and/or other web page content, according to a Wireless Application Protocol (WAP), Hypertext Transfer Protocol (HTTP), and/or the like.

The integrated resource transfer application 423 and the financial data module 427, together may include the necessary circuitry to provide token storage and transmission functionality, transmitter device signal encoding and decoding functionality to the mobile device 104, for secure transmission of financial and authentication credential tokens via the contactless communication interface 479 to the computer terminal 120. That said, in some embodiments the integrated resource transfer application 423 is pre-installed on the user device 104, while in other embodiments, the terminal 120 may transmit and cause installation of the application 423 based on determining that the user device 104 does not comprise the application 423, when the user device is within a pre-determined distance from the terminal 120.

The processor 410 may be configured to use the network interface device 470 to communicate with one or more other devices on a network 101 such as, but not limited to the computer terminal 120 and the processing system 130. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the mobile device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the mobile device 104 to receive data from the user 102, may include any of a number of devices allowing the mobile device 104 to receive data from a user 102, such as a keypad, keyboard, touch-screen, touchpad, microphone, mouse, joystick, other pointer device, button, soft key, and/or other input device(s).

The mobile device 104 may further include a power source 415. Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 415 may be a power adapter that can connect a power supply from a power outlet to the mobile device 104. In such embodiments, a power adapter may be classified as a power source "in" the mobile device 104.

The mobile device 104 may also include a memory buffer, cache memory or temporary memory device operatively coupled to the processor 410. Typically, one or more applications 425 and 423, are loaded into the temporarily memory during use. As used herein, memory may include any computer readable medium configured to store data, code, or other information. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the computer terminal 120 performing one or more steps described herein in conjunction with other devices and systems, either automatically based on executing computer readable instructions of the memory device 230, or in response to receiving control instructions from the processing system 103. In some instances, the system refers to the processing system 103. In some instances, the system refers to the devices and systems on the network environment 100 of FIG. 1. In some instances, the system refers to the mobile device 104. The features and functions of various embodiments of the invention are be described below in further detail.

Figure 5:
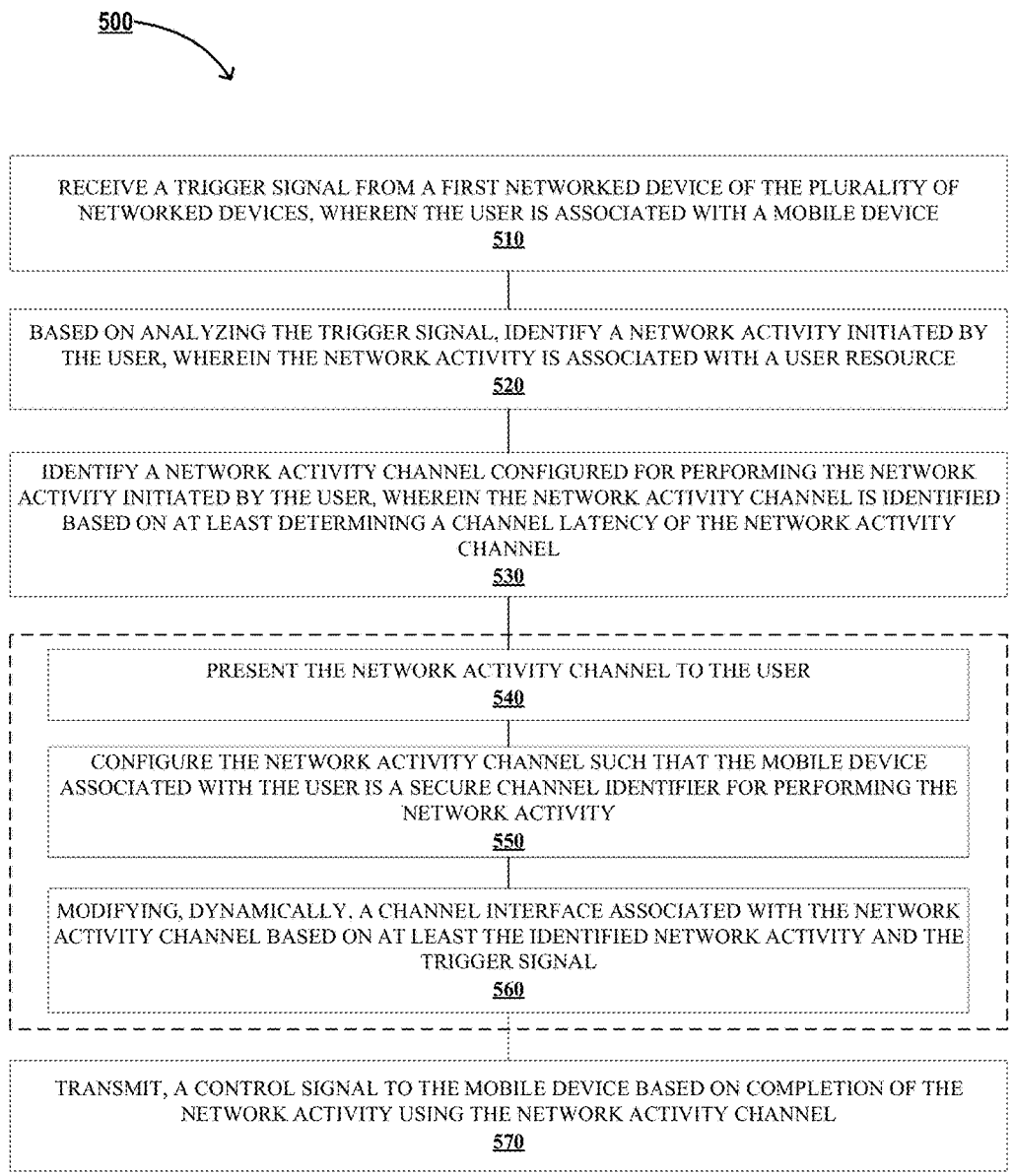
FIG. 5 illustrates a high level process flow 500 for mobile cellular device translation into a secure channel identifier for resource management, in accordance with some embodiments of the invention.

FIG. 5 illustrates a high level process flow 500 for mobile cellular device translation into a secure channel identifier for resource management, in accordance with some embodiments of the invention. As discussed previously, a user is typically associated with a mobile device (e.g., mobile device 104). As alluded to previously, the functionality of the mobile device 104 of the present invention is fundamentally transformed herein to convert the mobile device into a secure channel identifier for resource management. Specifically, the present invention configures the mobile device a central control for seamless multi-channel operative communication across a plurality of networked devices for performing network activities, which would not be possible otherwise.

Specifically, the present invention transforms the mobile device to function as a cross-channel remote for seamless cross-channel operative communication and engagement. As an example, the mobile device functions as a first node or point of contact for a user. The present invention may then present an interface on a display device of the mobile device, such as an interface of a personal digital assistant and knowledge navigator, or another smart interface. This interface may be initiated when the user seeks to perform a network activity, or may be initiated, proactively, based on determining, via a trigger signal, that the user may be required to perform a network activity. The present invention then configures the mobile device to communicate with a variety of networked devices, via cross-channel communication, based on identifying the one or more network activity channels suitable for or required for the determined network activity. In response, the present invention seamlessly blends and amalgamates functionality and interfaces of disparate networked device onto the mobile device, thereby configuring the mobile device as a secure temporary remote controller for the networked devices. Here, the present invention transforms the mobile device as a quasi-network controller for controlling the various networked devices, for example, by transmitting control signals from the mobile device to the networked devices and receiving response signals from the networked devices and the mobile device. In addition, the present invention configures the mobile device for pre-staging and customization of these amalgamated interfaces, for the purposes of performing the network activities.

As indicated by block 510, in some instances, the system (e.g., processing system 103, the computer terminal 120 and/or the mobile device 104) receives a trigger signal from a first networked device of the plurality of networked devices. Typically, the system, for example, via a communication device of the system, is configured to establish operative communication with a plurality of networked devices via an electronic communication network (e.g., network 101). The plurality of networked devices (e.g., the first networked device) may include one or more of mobile devices associated with users (e.g., mobile device 104, and/or positioning system device 460 of the mobile device), the computer terminals (e.g., computer terminal 120), sensor devices (e.g., sensor devices 112), one or more visual capture devices (e.g., devices 114), proximity sensors and position sensors described previously, and/or the like. In some embodiments, receiving the trigger signal from a first networked device comprises at least one of a user input provided at the mobile device. Here, the system may receive the trigger signal from the mobile device based on user input, such as textual input, gestures on a touch screen, predetermined special movement of the mobile device by the user, audio commands, and/or the like. In other instances, the system may receive a trigger signal from a smart device, such as a smart car, a smart door, or a smart television, indicating that the user has performed one or more predetermined activities associated with the smart device, based on prior user permissions and settings. In yet other instances, the trigger signal comprising a user geographic location signal is received from a positioning device of the mobile device (e.g., positioning system device 460 of the mobile device) when the user location coordinates are associated with a predetermined location or area or within a predetermined proximity of another device. In some embodiments, the system may identify the trigger signal based on analyzing user calendar data received from a calendar application stored on the mobile device. In some embodiments, the trigger signal may be received from an external system (e.g., social networking systems, merchant systems, and the like). In some embodiments, the trigger signal is transmitted by the proximity transmitter device when the user is within a predetermined proximity of the proximity transmitter device (e.g., proximity sensors and position sensors described previously). In some embodiments, the trigger signal is typically received in real time or near-real time of the user seeking to initiate a network activity. In some embodiments, the trigger signal comprises activity data associated with the user. The activity data may comprise user information, user resource (account) information, device location, time period, user preferences, user permissions, and/or other information relevant to the network activity that the user seeks to perform.

Next, as indicated by block 520, based on analyzing the trigger signal, the system is configured to identify a network activity initiated by the user. Typically, the network activity is associated with a user resource. For example, based on receiving a trigger signal indicating that the user has been with a predetermine proximity of a computer terminal/ATM, or based on user's publication on a social networking account regarding an event with a second user, and/or a user verbal query/search on the mobile device for nearest ATMs, the system may determine that the user seeks to provide a resource amount to the second user by withdrawing currency at an ATM. Here, the system may identify a network activity of a resource transfer/withdrawal from a user resource/account. As another example, the based on user calendar data and/or purchase data from the user's account or from a merchant system, the system may determine a network activity that the user will be visiting a sporting event. As another example, based on determining that the user is currently within a predetermined proximity of a smart door for a particular conference room, the system may determine that the user may seek to authenticate themselves and initiate a conference with an associate in the conference room, with the conference requiring a predetermined audio/video connectivity enabled on a user laptop computer.

In some embodiments, identifying the network activity comprises identifying a secondary activity that the user may be required to or may seek to perform. Continuing with the previous example, the system may determine primary activity that the user seeks to visit a sporting event. Based on analyzing the primary activity information such as the time and location of the event, distance from user's residence/work location, and trigger signal information indicating that the user only purchased entry tickets, the system may determine that the user would need to perform an secondary/auxiliary activity of purchasing a parking ticket prior to attending the event. As another example, as discussed above, based on determining that a network activity that user seeks to authenticate themselves and initiate a conference with an associate in the conference room, the system may identify an additional secondary/auxiliary activity of configuring the user laptop computer, such that the laptop computer has the required predetermined audio/video connectivity enabled, by transmitting control signals from the mobile device.

At block 530, the system identifies a network activity channel configured for performing the network activity (and/or the secondary/auxiliary activity) initiated by the user. Typically, the network activity channel is identified based on at least determining a channel latency of the network activity channel, as will be described below.

Typically, in some embodiments, the system identifies one or more (e.g., a plurality of) network activity channels configured for performing the network activity initiated by the user. Referring to the previous example of a network activity of a resource withdrawal by the user at an ATM for providing to a second user, the system may identify a first network activity channel of a physical channel of cash withdrawal at an ATM and based on identifying that the second user has a resource/account with the financial institution, the system may identify a second network activity channel of an electronic resource transfer. The system may then determine, for each network activity channel, a channel latency, for example, a time period or duration for completion of the activity and/or an activity channel resource utilization offset (e.g., incentives, rebates, offers, and the like) availability. Next, the system may selecting the network activity channel of the electronic resource transfer for performing the payment to the second user based on determining that this channel has a predetermined channel latency, i.e., this channel requires the least time for completion of the activity and/or that a resource utilization offset, i.e., an offer/rebate is available to be applied when utilizing the second channel. As such, the predetermined channel latency may comprise one or more of minimum activity time or duration for completion of network activity, minimum resource utilization or cost for the channel, minimum travel distance for the user, and a highest available activity channel resource utilization offset.

As another example, as discussed above, for an secondary/auxiliary activity of purchasing a parking ticket prior to attending the event, the system may determine that the parking tickets may only be purchased in cash at the parking location. Consequently, the system may identify a first network activity channel of cash withdrawal at an ATM and a second network activity channel of cash withdrawal at another point of sale terminal. Here based on determining that the point of sale terminal is closer to the parking location and/or that the point of sale terminal is enroute during user's travel, the system may select the network activity channel of the point of sale terminal instead of the ATM.

As another example, for network activity of initiating a conference between the user and an associate, the system may determine that the user is within a predetermined proximity of a user smart television and that the smart television has a conferencing application. The system may then determine that a network activity channel involving communication between the mobile device (e.g., for input and/or output purposes, for authentication purposes, and the like) and the smart television has an optimal or lower channel latency in comparison with other channels involving installation of specific software or software updates on the mobile device for the conference, or channels involving the user travelling to another location or channel involving utilization of offline or distant devices. In this regard, in addition to or separately from authentication of the user/mobile device, the system may transmit a security token to the smart device, which when transmitted from the smart device to the mobile device, securely and operatively couples the devices for a predetermined time period (e.g., expected or determined duration of the conference), or vice versa.

Subsequently, at block 540, the system presents the network activity channel to the user. Here, as indicated by blocks 550 and 560, the system configures the network activity channel such that the mobile device associated with the user is a secure channel identifier for performing the network activity, and modifies, dynamically, a channel interface associated with the network activity channel based on at least the identified network activity and the trigger signal, as will be described in detail below. For example, the system may present at least a portion of the functionality of at least one interface of at least one operatively coupled networked device (e.g., smart device) on a display of the mobile device for performing the network activity.

In some embodiments, the system may access a mobile device security identifier stored in the mobile device, such as a secure storage location accessible only by an application associated with the present invention. In some embodiments, the secure storage location contains predetermined code, which is configured to generate a unique encoded mobile device security identifier token, every time the identifier is requested. In this regard, only secure or pre-authenticated networked devices may comprise a decoding algorithm configured for processing the encoded mobile device security identifier. Next, the system or the associated networked device (e.g., computer terminal) may validate user authentication credentials received at the mobile device from the user. Subsequently, the system may authenticate, the mobile device for performing the network activity via the channel, based on (i) successful validation of the user authentication credentials, and (ii) the mobile device security identifier. In response, the system may allow the user to perform the user activity, via the network activity channel, using the mobile device.

Alternatively or in addition to the above, the mobile device may validate security credentials received from the networked devices. Subsequently, the mobile device may authenticate the networked device prior to establishing an operative coupling of the mobile device and the networked device (e.g., computer terminal).

In some embodiments, in response to identifying a trigger signal and a time-sensitive network activity, the system may determine that the user mobile device is offline, for example, due to an existing internal process currently running (e.g., battery conservation setting). Here, the system is configured for transmitting an activation signal to the mobile device, e.g., via a data network or a text message, or via a near field communication signal from a nearby device (e.g., smart speaker or another smart device). This activation signal is configured to cause an offline mobile device to connect to the communication network (e.g., by disabling the internal process).

In some embodiments, the system typically transmits an interface control signal to cause the mobile device to overlay the channel interface associated with the network activity channel (i.e., the amalgamated composite interface associated with the identified channel) on an existing display device interface of the mobile device. Typically, overlaying the channel interface comprises disabling the existing display device interfaces such that only the channel interface is active. In this instance, the system may then modify, dynamically, the channel interface associated with the network activity channel further by modifying at least one graphical element (e.g., action buttons, input/output graphical elements, backgrounds, scroll buttons, radio buttons, and the like) presented on the channel interface based on the identified network activity and the trigger signal. For example, the system may alter the at least one graphical element to include at least a portion of a user image retrieved from a storage location of the mobile device based on received user permissions, such as an image of the user, images associated with the location of the network activity based on user's prior activities, and the like. As another example of the amalgamated interface, the system may add an additional functional interface element, such as a drop down menu from an interface of a first networked device and alter an existing graphical element (e.g., icons) to substitute graphical elements (e.g., icons) retrieved from an interface of a second networked device.

As alluded to previously, the channel interface is configured as a remote control for allowing the user to perform the network activity using the mobile device and cross-channel communication, via a single interface, without requiring the user to navigate multiple interfaces and applications.

In some embodiments, (for example, based on identifying a network activity channel of a withdrawal from an ATM, or a conference via a smart television) the system may establish, via the communication network, a wireless communication channel between the mobile device and the computer terminal. Next, the system may transmit a control signal to the mobile device. This signal is typically configured to cause the mobile device to transmit the mobile device security identifier to the computer terminal via the wireless communication channel. The system may then establish an operative coupling of the mobile device and the computer terminal based on successful validation of the mobile device security identifier. Finally, the system may allow or enable the user to perform the user activity at the computer terminal based on (i) receiving user input at the computer terminal via the wireless communication channel, wherein the user input is provided by the user at the mobile device and not at the computer terminal, and (ii) presenting the channel interface on the mobile device such that the channel interface comprises at least a portion of an interface presented on the computer terminal (e.g., functional elements and graphical features that are pertinent for performing the network activity). For example, for an activity being performed on the mobile device using an application stored on networked devices/computer terminals, such as a smart TV or an ATM, the system may modify the interface presented on the mobile device to include authentication features, relevant input output features, images, security features, and/or the like from interfaces of the networked devices/computer terminals which would otherwise be presented on and required to be operated on the networked devices/computer terminals themselves. In this regard, the networked devices/computer terminals may transmit activity signals to the mobile device to facilitate the modification of the channel interfaces. As discussed previously, the networked devices/computer terminals may be at least one of an ATM, a transaction terminal, a smart device, and a communication device.

In some embodiments, the system may modify, dynamically, the channel interface associated with the network activity channel by modifying at least one first graphical element displayed on a display device interface of the computer terminal in real time, for example, based on identifying that the user is within a predetermined proximity to the computer terminal. Typically, as discussed previously, modifying the at least one graphical element comprises altering the at least one graphical element to include at least a portion of a user image retrieved from a storage location of the mobile device or another image associated with the user (e.g., an image of the user or an image of the location where the user performed the network activity previously). As referred to herein, identifying, by the system, that the user is within the predetermined proximity to the computer terminal may based on at least one of (i) the established operative coupling of the mobile device and the computer terminal, (ii) determining, via received location signals from a positioning device of the mobile device, that the mobile device is within the predetermined proximity to the computer terminal, and (iii) identifying, via an image capture device, that the user is within the predetermined proximity to the computer terminal.

Moreover, the system may then transmit, a control signal to the mobile device based on completion of the network activity using the network activity channel, as indicated by block 570, for example, for causing the end of the operative coupling of the devices to maintain the security of the devices, to reinstate existing user interfaces or control of the mobile device, to render the mobile device back to its original state (e.g., offline state, resuming stopped internal operations), and/or the like.

Typically, the computer terminal is configured to recognize a user device and the user associated with the device (for example, based on retrieving unique identifiers of the device) when the user device is within a predetermined proximity/distance from the terminal, for example, when the user is waiting in a line of the terminal. The computer terminal may then establish an operative communication with the user device, for example, via a wireless communication channel, Wi-Fi communication channel, NFC and the like. The computer terminal may then proceed to authenticate the user while the user is still waiting in the like, via the user device. For example, the computer terminal may receive, via the communication channel, a biometric credential such as a fingerprint scan performed by the user on the user device, and pre-authenticate the user even before the user approaches the terminal. The system may also pre-authenticate the user and continue to monitor the status of the authentication until the user initiates a user activity by approaching the terminal, for example, using visual capture device and facial recognition of the user.

In some embodiments, the terminal may transmit a message to the user (for example, via the integrated resource transfer application or via the Wi-Fi or telecommunication channel) mobile device requesting the user to choose a user activity that the user wishes to perform at the terminal. The computer terminal may then customize the user interface or pre-stage the user interface when the user approaches the terminal to facilitate easier and quicker user activity completion. Also, the system may recognize the user as a previous customer while the user is standing in a line, and then pre-stage the user interface for the user when the user approaches the terminal.

In some embodiments, the terminal, via the established communication channel, may determine that the user device does not comprise the integrated resource transfer application, for example based on ascertaining that the user is required to provide authentication credentials/passcodes via the application, based on determining that the user activity specified by the user requires the application (e.g., for withdrawing a denomination of bills that are not entirely available at the terminal). The system may then transmit the application and/or cause the user device to download and install the integrated resource transfer application on the user device. In some embodiments, the integrated resource transfer application is an integrated person-to person or P2P payment application that typically also comprises social network capabilities and/or chat/communication capabilities (for example, "Zell" application). In some instances, the application typically operates based on non-financial user information such as user email, phone number, and the like. This integrated P2P application may be associated with a plurality of financial institutions and may utilize the financial channels and security features of these financial institutions. In some embodiments, the integrated resource transfer application or the P2P application is a part of the activity application 425. In some embodiments, before causing download and/or installation of the application, the terminal may ascertain that the user device has sufficient connectivity, sufficient access to a network of at least a predetermined bandwidth or speed for the download.

When the user approaches the terminal and initiates the user activity of the check deposit. As described above, the terminal may transmit at least a portion of the check amount to the integrated resource transfer application. The terminal may then request the user to "tap" the user device at the terminal, and subsequently initiate the transfer. Therefore, even users without any financial instruments (such as credit, debit cards) with them or any financial institution accounts may also deposit checks and receive the check amount as deposits directly into the integrated resource transfer application.

Proactive and User-Specific Interfaces and Information Interchange

As discussed earlier, the computer terminal is configured to provide pre-staged, streamlined and customized user interfaces for performing the user activity in a quick manner. Furthermore, the terminal is configured for machine learning and customizes the user interfaces and activities based on analyzing past preferences/behaviors of the user. For example, the terminal may determine that the user chose to transfer a change amount (i.e., amount whose denominations are not available at the terminal or that require coins which are not available) to the integrated resource transfer application in 3 instances and chose to donate the change amount to charity in 2 instances of 5 total previous instances, in the user interface, the system may only provide the options for the transfers to the application and the charity, for ease and speed of the activity. Alternatively, the system may automatically transfer the amount to the integrated user application and optionally provide a choice or charity from within the integrated user application.

Performing User Activities Using a Variety of Communication Channels

As discussed previously, the computer terminal is equipped with an intelligent personal assistant or other forms of artificial intelligence. The intelligent personal assistant may facilitate one or more of the user activities or steps described herein. Moreover, the terminal may be equipped with audio and video communication channels. The terminal may facilitate a "hands free" operation of the terminal or performance of the user activity by the user at the terminal using solely audio commands, gestures, and/or operations in the user mobile device.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/632,731 | RESOURCE DISTRIBUTION CHANNEL AUTHORIZATION THROUGH THIRD PARTY SYSTEM INTEGRATION | Concurrently herewith |
| 15/633,238 | CASSETTE SYSTEM FOR SECURE RESOURCE DISTRIBUTION | Concurrently herewith |
| 15/632,728 | MACHINE PRESENTED TARGETED ODD DENOMINATIONAL RESOURCE DISTRIBUTOR SYSTEM | Concurrently herewith |

What is claimed is:

1. A system for mobile device translation into a secure channel identifier for resource management, wherein the system is configured to establish a network activity channel with a networked device based on determining channel latency, the system comprising:
 a memory device with computer-readable program code stored thereon;
 a communication device, wherein the communication device is configured to establish operative communication with a plurality of networked devices via a communication network;
 a processing device operatively coupled to the memory device and the communication device, wherein the processing device is configured to execute the computer-readable program code to:
  receive, via a first operative communication channel, a trigger signal from a first networked device of the plurality of networked devices, wherein the trigger signal comprises activity data associated with a user, wherein the user is associated with a mobile device;
  based on analyzing the trigger signal, identify a network activity initiated by the user, wherein the network activity is associated with a user resource;
  identify a network activity channel configured for performing the network activity initiated by the user, wherein the network activity channel is identified based on at least determining a channel latency of the network activity channel;
  present the network activity channel to the user, wherein presenting the network activity channel comprises:
   configuring the network activity channel such that the mobile device associated with the user is a secure channel identifier for performing the network activity; and
   modifying, dynamically, a channel interface associated with the network activity channel based on at least the identified network activity and the trigger signal; and
  transmit, a control signal to the mobile device based on completion of the network activity using the network activity channel.

2. The system claim 1, wherein configuring the network activity channel such that the mobile device associated with the user is a secure channel identifier for performing the network activity further comprises:
 transmitting a activation signal to the mobile device, wherein the activation signal is configured to cause an offline mobile device to connect to the communication network; and
 transmitting an interface control signal to cause the mobile device to overlay the channel interface associated with the network activity channel on an existing display device interface of the mobile device, wherein overlaying the channel interface comprises disabling the existing display device interface such that only the channel interface is active;
 wherein the channel interface is configured as a remote control for allowing the user to perform the network activity using the mobile device.

3. The system claim 2, wherein modifying, dynamically, the channel interface associated with the network activity channel further comprises modifying at least one graphical element presented on the channel interface based on the identified network activity and the trigger signal, wherein modifying the at least one graphical element based on the trigger signal comprises altering the at least one graphical element to include at least a portion of a user image retrieved from a storage location of the mobile device.

4. The system claim 1, wherein configuring the network activity channel such that the mobile device associated with the user is a secure channel identifier for performing the network activity further comprises:

accessing a mobile device security identifier stored in the mobile device;
validating user authentication credentials received at the mobile device from the user;
authenticating, based on (i) successful validation of the user authentication credentials, and (ii) the mobile device security identifier, the mobile device for performing the network activity via the channel; and
allowing the user to perform the network activity, via the network activity channel, using the mobile device.

5. The system claim 4, wherein the first networked device is a computer terminal, wherein authenticating the mobile device for performing the network activity via the channel further comprises:
establishing, via the communication network, a wireless communication channel between the mobile device and the computer terminal;
transmitting a control signal to the mobile device, wherein the control signal is configured to cause the mobile device to transmit the mobile device security identifier to the computer terminal via the wireless communication channel;
establishing an operative coupling of the mobile device and the computer terminal based on successful validation of the mobile device security identifier; and
allowing the user to perform the network activity at the computer terminal based on (i) receiving user input at the computer terminal via the wireless communication channel, wherein the user input is provided by the user at the mobile device and not at the computer terminal, and (ii) presenting the channel interface on the mobile device such that the channel interface comprises at least a portion of an interface presented on the computer terminal.

6. The system claim 5, wherein allowing the user to perform the network activity at the computer terminal further comprises:
transmitting, from the computer terminal, an activity signal to the mobile device, wherein the activity signal is configured to modify the channel interface for performing the network activity.

7. The system claim 5, wherein the computer terminal is one of an ATM, a transaction terminal, a smart device, and a communication device.

8. The system claim 5, wherein modifying, dynamically, the channel interface associated with the network activity channel further comprises: modifying at least one first graphical element displayed on a display device interface of the computer terminal in real time, based on identifying that the user is within a predetermined proximity to the computer terminal, wherein modifying the at least one graphical element comprises altering the at least one graphical element to include at least a portion of a user image retrieved from a storage location of the mobile device.

9. The system claim 8, wherein identifying that the user is within the predetermined proximity to the computer terminal is based on at least one of (i) the established operative coupling of the mobile device and the computer terminal, (ii) determining, via received location signals from a positioning device of the mobile device, that the mobile device is within the predetermined proximity to the computer terminal, and (iii) identifying, via an image capture device, that the user is within the predetermined proximity to the computer terminal.

10. The system of claim 1, wherein identifying the network activity channel configured for performing the network activity initiated by the user further comprises:
identifying a plurality of network activity channels configured for performing the network activity initiated by the user;
determining, for each network activity channel, a channel latency;
selecting the network activity channel of the plurality of network activity channels for performing the network activity based on determining that the network activity channel has a predetermined channel latency.

11. The system of claim 9, wherein the predetermined channel latency comprises at least one of minimum activity time, minimum resource utilization, minimum travel distance, and a activity channel resource utilization offset.

12. The system of claim 1, wherein identifying a network activity initiated by the user further comprises:
identifying a primary activity associated with the user resource that the user seeks to perform;
based on analyzing the primary activity and the trigger signal, identifying an auxiliary activity associated with performing the primary activity; and
identifying the network activity channel configured for performing the auxiliary activity.

13. The system of claim 1, wherein the first networked device is the mobile device, wherein the trigger signal comprises at least one of a user input provided at the mobile device, a user geographic location signal received from a positioning device of the mobile device, and user calendar data from a calendar stored on the mobile device.

14. The system of claim 1, wherein the first networked device is a proximity transmitter device, wherein the trigger signal is transmitted by the proximity transmitter device based on determining that the user is within a predetermined proximity of the proximity transmitter device.

15. A computer-implemented method for mobile device translation into a secure channel identifier for resource management, wherein the method is configured to establish a network activity channel with a networked device based on determining channel latency, the computer-implemented method comprising:
receiving, via a first operative communication channel, a trigger signal from a first networked device of a plurality of networked devices via a communication network, wherein the trigger signal comprises activity data associated with a user, wherein the user is associated with a mobile device;
based on analyzing the trigger signal, identifying a network activity initiated by the user, wherein the network activity is associated with a user resource;
identifying a network activity channel configured for performing the network activity initiated by the user, wherein the network activity channel is identified based on at least determining a channel latency of the network activity channel;
presenting the network activity channel to the user, wherein presenting the network activity channel comprises:
configuring the network activity channel such that the mobile device associated with the user is a secure channel identifier for performing the network activity; and
modifying, dynamically, a channel interface associated with the network activity channel based on at least the identified network activity and the trigger signal; and
transmit, a control signal to the mobile device based on completion of the network activity using the network activity channel.

16. The computer-implemented method of claim 15, wherein configuring the network activity channel such that the mobile device associated with the user is a secure channel identifier for performing the network activity further comprises:
- transmitting a activation signal to the mobile device, wherein the activation signal is configured to cause an offline mobile device to connect to the communication network; and
- transmitting an interface control signal to cause the mobile device to overlay the channel interface associated with the network activity channel on an existing display device interface of the mobile device, wherein overlaying the channel interface comprises disabling the existing display device interface such that only the channel interface is active;
- wherein the channel interface is configured as a remote control for allowing the user to perform the network activity using the mobile device.

17. The computer-implemented method of claim 15, wherein configuring the network activity channel such that the mobile device associated with the user is a secure channel identifier for performing the network activity further comprises:
- accessing a mobile device security identifier stored in the mobile device;
- validating user authentication credentials received at the mobile device from the user;
- authenticating, based on (i) successful validation of the user authentication credentials, and (ii) the mobile device security identifier, the mobile device for performing the network activity via the channel; and
- allowing the user to perform the network activity, via the network activity channel, using the mobile device.

18. The computer-implemented method of claim 17, wherein the first networked device is a computer terminal, wherein authenticating the mobile device for performing the network activity via the channel further comprises:
- establishing, via the communication network, a wireless communication channel between the mobile device and the computer terminal;
- transmitting a control signal to the mobile device, wherein the control signal is configured to cause the mobile device to transmit the mobile device security identifier to the computer terminal via the wireless communication channel;
- establishing an operative coupling of the mobile device and the computer terminal based on successful validation of the mobile device security identifier; and
- allowing the user to perform the network activity at the computer terminal based on (i) receiving user input at the computer terminal via the wireless communication channel, wherein the user input is provided by the user at the mobile device and not at the computer terminal, and (ii) presenting the channel interface on the mobile device such that the channel interface comprises at least a portion of an interface presented on the computer terminal.

19. The computer-implemented method of claim 17, wherein modifying, dynamically, the channel interface associated with the network activity channel further comprises: modifying at least one first graphical element displayed on a display device interface of the computer terminal in real time, based on identifying that the user is within a predetermined proximity to the computer terminal, wherein modifying the at least one graphical element comprises altering the at least one graphical element to include at least a portion of a user image retrieved from a storage location of the mobile device.

20. A computer program product for mobile device translation into a secure channel identifier for resource management, wherein the computer program product, when implemented by a processor is configured to establish a network activity channel with a networked device based on determining channel latency, wherein the computer program product comprises at least one non-transitory computer-readable medium having computer-readable program code portions embodied therein, the computer-readable program code portions which when executed by a processing device are configured to cause the processor to:
- receive, via a first operative communication channel, a trigger signal from a first networked device of a plurality of networked devices via a communication network, wherein the trigger signal comprises activity data associated with a user, wherein the user is associated with a mobile device;
- based on analyzing the trigger signal, identify a network activity initiated by the user, wherein the network activity is associated with a user resource;
- identify a network activity channel configured for performing the network activity initiated by the user, wherein the network activity channel is identified based on at least determining a channel latency of the network activity channel;
- present the network activity channel to the user, wherein presenting the network activity channel comprises:
  - configuring the network activity channel such that the mobile device associated with the user is a secure channel identifier for performing the network activity; and
  - modifying, dynamically, a channel interface associated with the network activity channel based on at least the identified network activity and the trigger signal; and
- transmit, a control signal to the mobile device based on completion of the network activity using the network activity channel.

* * * * *